United States Patent
Nieminen et al.

(10) Patent No.: US 10,451,437 B2
(45) Date of Patent: Oct. 22, 2019

(54) METHOD FOR DETERMINING A MEASURABLE TARGET VARIABLE AND CORRESPONDING SYSTEM

(71) Applicant: Suunto Oy, Vantaa (FI)

(72) Inventors: Heikki Nieminen, Vantaa (FI); Erik Lindman, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 741 days.

(21) Appl. No.: 13/827,418

(22) Filed: Mar. 14, 2013

(65) Prior Publication Data
US 2013/0311123 A1    Nov. 21, 2013

Related U.S. Application Data

(60) Provisional application No. 61/649,617, filed on May 21, 2012.

(51) Int. Cl.
*G01C 25/00*    (2006.01)
*G01L 27/00*    (2006.01)
(Continued)

(52) U.S. Cl.
CPC .............. *G01C 25/00* (2013.01); *G01L 27/00* (2013.01); *G01P 21/00* (2013.01); *A43B 3/00* (2013.01);
(Continued)

(58) Field of Classification Search
CPC ................................ G01C 25/00; G01L 27/00
(Continued)

(56) References Cited

U.S. PATENT DOCUMENTS 5,530,447 A * 6/1996 Henderson ............ G01S 13/931
340/904
5,646,857 A    7/1997 McBurney et al.
(Continued)

FOREIGN PATENT DOCUMENTS

EP    0715150 A1    5/1996
EP    1837627 A2    9/2007
(Continued)

OTHER PUBLICATIONS

Hans C. Ohanian, "Energy in Circuits; Joule Heat", "Physics", 1985, W.W. Norton & Company, ISBN 0-393-95401-3.
(Continued)

*Primary Examiner* — Mohamed Charioui
*Assistant Examiner* — Christine Y Liao
(74) *Attorney, Agent, or Firm* — Seppo Laine Oy

(57) ABSTRACT

The invention relates to a method and a system for determining a target variable to be measured in a mobile device. A first physical variable is measured with the aid of a first sensor and a second physical variable with the aid of a second sensor. The second physical variable is different to the first physical variable, or is measured using a different technique. The value of the target variable is calculated with the aid of the measurement of the first and second physical variables. An estimate for the target variable is determined with the aid of at least the measurement of the first physical variable. At least a first error estimate is determined, which depicts the accuracy of the measurement of the first physical variable. The estimate of the target variable is filtered using both the first error estimate and the measurement of the second physical variable.

29 Claims, 8 Drawing Sheets

(51) Int. Cl.
*G01P 21/00* (2006.01)
*G01C 22/00* (2006.01)
*A63B 24/00* (2006.01)
*A46B 3/00* (2006.01)
*A43B 3/00* (2006.01)

(52) U.S. Cl.
CPC ............. *A46B 3/00* (2013.01); *A63B 24/0062* (2013.01); *G01C 22/006* (2013.01)

(58) Field of Classification Search
USPC ..... 702/94, 150, 153, 179, 183; 342/357.06; 345/175
See application file for complete search history.

(56) References Cited

U.S. PATENT DOCUMENTS

| | | | |
|---|---|---|---|
| 6,081,230 A * | 6/2000 | Hoshino | G01C 21/165 342/357.32 |
| 6,145,389 A | 11/2000 | Ebeling et al. | |
| 6,331,835 B1 * | 12/2001 | Gustafson | G01C 21/165 342/357.59 |
| 6,408,245 B1 | 6/2002 | An et al. | |
| 6,735,542 B1 | 5/2004 | Burgett et al. | |
| 6,970,795 B1 | 11/2005 | Burgett et al. | |
| 7,152,470 B2 | 12/2006 | Impio et al. | |
| 7,803,117 B2 | 9/2010 | Martikka et al. | |
| 8,024,023 B2 | 9/2011 | Tolvanen | |
| 8,164,514 B1 | 4/2012 | Yang et al. | |
| 8,275,311 B2 | 9/2012 | Lindman | |
| 8,292,820 B2 | 10/2012 | Punkka et al. | |
| 8,371,745 B2 | 2/2013 | Manni | |
| 8,386,009 B2 | 2/2013 | Linberg et al. | |
| 8,750,959 B2 | 6/2014 | Lindberg et al. | |
| 8,814,574 B2 | 8/2014 | Selby et al. | |
| 8,886,281 B2 | 11/2014 | Pernu et al. | |
| 2009/0143983 A1 | 6/2009 | Venkatraman et al. | |
| 2010/0109945 A1 | 5/2010 | Roh | |
| 2010/0204916 A1 | 8/2010 | Garin | |
| 2010/0210421 A1 | 8/2010 | Case, Jr. et al. | |
| 2011/0199340 A1 * | 8/2011 | Aikio | G02B 6/0021 345/175 |
| 2012/0123232 A1 * | 5/2012 | Najarian | A61B 5/0022 600/345 |

FOREIGN PATENT DOCUMENTS

| | | |
|---|---|---|
| JP | 2009079928 A | 4/2009 |
| JP | 2009192462 A | 8/2009 |
| JP | 2011080834 A | 4/2011 |
| WO | WO9942788 A1 | 8/1999 |

OTHER PUBLICATIONS

Glenn F. Knoll, "Radiation Detection and Measurement", 1989, John Wiley & Sons, Inc., ISBN 0-471-81504-7.

Strietelmeier: FitSense FS-1 Speedometer Watch Review, Oct. 13, 2017.

* cited by examiner

METHOD FOR DETERMINING A MEASURABLE TARGET VARIABLE AND CORRESPONDING SYSTEM

RELATED APPLICATIONS

The present application claims priority to U.S. Provisional Patent Application Ser. No. 61/649,617 titled METHOD FOR DETERMINING A MEASURABLE TARGET VARIABLE AND CORRESPONDING SYSTEM, and filed on May 21, 2012.

FIELD OF THE INVENTION

The invention relates to sensor-fusion technology in mobile devices, i.e. more specifically the processing of information provided by many sensors. The invention particularly relates to improving the accuracy of a target variable measured with the aid of a mobile device or system. The sensors can be, for example, a GPS sensor or pressure sensor, as well as an acceleration sensor. The speed and/or altitude of the target variable can be measured using one or more of the sensors. The mobile device can be, for example, a wristop computer, a mobile telephone, other portable device or a sensor unit, or some functional combination of these.

BACKGROUND OF THE INVENTION

GPS speed on the wrist or elsewhere on the body contains a great deal of noise, but has a very small bias error, i.e. a systematic error. The accuracy of a GPS speed signal shown on the frequency level is very close to direct current DC and diminishes rapidly as the frequency increases, as shown in FIG. 1 with the aid of curve 1. The measurement accuracy can be improved using traditional signal filtering methods, or with the aid of GPS-Doppler measurement. Nevertheless, at a typical measurement frequency of 1 Hz, and with the person walking, the noise in a purely GPS-based speed measurement can be in the order of as much as 20-30%, compared to the signal.

On the other hand, the speed estimated from an acceleration sensor on the wrist or elsewhere on the body contains less noise, so that its accuracy will remain good when the frequency increases, up to a certain limit. However, there can be even a large bias error in speed measured in this way. Accordingly, the best accuracy of speed estimated from acceleration is poorer than when using GPS. The accuracy in the frequency plane of speed measured with the aid of an acceleration sensor is typically according to curve 2 of FIG. 1.

However, in practice the aim would be to obtain speed accuracy on the frequency level according to curve 3 of FIG. 1, i.e. accurate measurement over a wide range. The aim is also to create measurement that reacts sufficiently well to changes in the state of motion, but poorly to error sources relating to the measurement event itself.

Similar problems also relate to the GPS-based determining of altitude and vertical speed. Further, a somewhat similar problem also relates to the determining of altitude information with the aid of a pressure sensor, though in this case the errors are caused by slow (low-frequency) variations in atmospheric pressure.

SUMMARY OF THE INVENTION

The invention is intended to provide a new type of method for determining, in a mobile device, a target variable being measured, and a corresponding system. The invention's objective is particularly to improve the accuracy of vertical and/or horizontal speed and/or altitude calculated with the aid of positioning-sensor information, or of altitude or vertical speed calculated with the aid of pressure information, in varying movement and ambient conditions.

In the invention, sensor fusion is exploited in a new way, i.e. more specifically the calculation of a desired variable exploits the information provided by at least two different sensors measuring the same or a different physical variable.

In the method according to one embodiment, a first and a second physical variable are measured with the aid of first and second sensors respectively. The value of the target variable is calculated with the aid of the first and second measurements from the first and second sensors, such that:
- an estimate of the target variable is determined with the aid of the measurement of at least a first physical variable;
- at least a first error estimate is determined, which depicts the error of the measurement of the first physical variable;
- an error estimate for the computation model is determined, which estimates how well the computation model corresponds to the real situation, with the aid of the measurement of at least a second physical variable; and
- the estimate of the target variable is filtered at a strength that depends on both the error estimate of the measurement and the error estimates of the said computation model.

The second physical variable can be a different variable to the first physical variable, or at least measured using a different technique. The difference in technique can be, for instance, a different placing of the sensor, or a different measurement model by means of which the measurement is converted into the target variable. Thus, the first and the second sensor are typically based on a different operating principle, even when they are measuring the same physical variable. For example, horizontal speed (speed of progression) can be measured with the aid of a satellite-positioning sensor and/or with the aid of an acceleration sensor. Correspondingly, altitude or rate of climb (vertical speed) can be measured with the aid of a satellite-positioning sensor, an acceleration sensor, and/or a pressure sensor. The first and second sensors are preferably based on measurement techniques that have error profiles that differ essentially from each other, as functions of the measuring frequency. However, some estimate of the target variable or its change must be able to be derived from the data provided by both sensors, either directly or through a mathematical model and/or initial data.

According to one central embodiment in the method, speed is measured with the aid of a satellite-positioning sensor (such as a GPS sensor) and acceleration with the aid of an acceleration sensor. The final speed value to be given to the user is calculated with the aid of the speed and acceleration measurements, in such a way that:
- an estimate is determined for speed, with the aid of a satellite-positioning measurement and/or an acceleration measurement;
- a first error estimate is determined, which depicts the error in the satellite-positioning-based speed measurement;
- a second error estimate is determined, which depicts the error in the acceleration-based speed measurement;
- a first error estimate for the computation model is determined with the aid of a satellite-positioning measurement;

a second error estimate for the computation model is determined with the aid of an acceleration measurement; and the speed estimate is filtered using a strength that depends on the error value of the said measurements and the said error values of the computation model.

According to a preferred embodiment, a speed estimate is determined, at least when the preset quality conditions of the measurement are met, with the aid of both satellite-positioning measurement and acceleration measurement, and weighting them in a desired manner. It is also possible to determine error estimates, which depict the magnitude of the errors of the measurements of speed. These error estimates can be further used to determine the weightings of the calculation of the speed estimate. Further, it is possible to determine a second error estimate, which depicts the magnitude of the error of the computation model. The error of the computation model and the error of the speed estimate can be further used to determine the filtering strength of the speed estimate.

The speed can be either the horizontal or the vertical speed, or the sum (or combination) of these velocities.

The method according to the invention can be performed either entirely or partly in a wristop computer. If it is performed only partly in a wristop computer, some part of it can be performed in a remote sensor, which can be located in a separate device unit, or belong to some second device unit, such as a mobile telephone. The part in question can be the measurement of the first and/or second physical variable, i.e. for example, in the case of the speed measurement described above, the measurement of speed and/or acceleration, and/or of the calculation.

In a particularly preferred embodiment, the acceleration measurement is performed with the aid of an acceleration sensor in a wristop device, because acceleration measurement from the wrist is very reliable, due to the natural movement of the hand.

The method according to the invention can also be performed entirely or partly in a mobile telephone. If it is performed only partly in a mobile telephone, some part of it can be performed in a remote sensor, which can be located in a separate device unit, or belong to some other device unit, such as a wristop computer. The part in question can be the measurement and/or calculation of the first and/or second physical variable, i.e. for example, in the case of the speed measurement described above, the measurement and/or calculation of speed and/or acceleration.

Generalizing, it can be stated that the method according to the invention can also be performed entirely or partly in a portable device with a display, which is arranged to display the calculated value of the target variable to the user. The portable device can be a wristop computer, a smart phone, a tablet computing device, a laptop, a portable satellite-positioning device, an outdoor-recreation computer, a yachting computer, and other portable electronic computing devices.

On the other hand, the method according to the invention can also be performed entirely or partly in a portable device without a display, such as in a satellite-positioning module, which is linked wirelessly to a portable device with a display, such as with a wristop computer or mobile telephone, and/or the stored data can be read later, for example, to a computer. The advantage of this embodiment is the reduction in power consumption in the portable device with a display.

The system according to the invention comprises corresponding device units, the wireless communications mechanisms that may be required between them, and is arranged to implement the method according to the invention. Various examples of alternatives and their advantages will be described later in greater detail.

Considerable advantages are gained with the aid of the invention. When the target variable changes rapidly, this can be detected and, in turn, the filtering level, which is used when calculating the value of the target variable, can be altered. Correspondingly, if the values of the target variable given by the sensors differ considerably from each other, it can be concluded that there must be some explainable error source in one of the measurements. Such a situation is, for example, when a GPS sensor is taken under a large bridge, where there is no GPS signal. If the acceleration sensor still shows that the device is moving, the speed calculated on the basis of the acceleration sensor can be given greater weight in the final determination of the speed.

According to one preferred embodiment, the estimate for the target variable is calculated with the aid of the measurement of first and second physical variables, and further a second error estimate is determined, which depicts the accuracy of the measurement of the second physical variable. Finally, the value of the target variable is calculated by filtering the estimate of the target variable at a strength that depends on both the first and the second error estimates. Thus, the accuracy of both the first and the second sensors can be taken into account, before that final result is displayed to the user.

According to one embodiment in the calculation of the target variable, the strength of the filtering is increased when the accuracy of the measurement of the first and/or second physical variable weakens, and vice versa. Thus, variations in the target variable due to a measurement error are not transmitted detrimentally to the user's device, but when the measurement error is small the time resolution of the measurement will nevertheless remain good.

According to one preferred embodiment, during the measurement, the rate of change of the target variable is detected, either on the basis of an estimate of it or of its final value, or directly from the measurement data of the first or second sensor. If it is noticed that the rate of change of the target variable exceeds a preset limit, or is increasing; the strength of the filtering is reduced in the calculation of the target variable. The method then reacts faster to variations in conditions and the user can be provided with information that is more real-time.

As stated above, one significant practical application of the invention presents a solution, in which the target variable is speed and the first sensor is a satellite-positioning sensor, such as a GPS receiver. In that case, the first physical variable is speed or absolute/relative position. If position is measured, the speed can be calculated on the basis of position and time information. On the other hand, if the GPS speed is measured, for example, with the aid of the Doppler effect, the speed is obtained directly from the GPS data. A combination of these ways of measurement is also possible.

As a second possible application of the invention, a solution is referred to, in which the target variable is altitude or vertical speed ("rate of climb" or "rate of descent"), the first sensor is an atmospheric-pressure sensor, and the first physical variable is correspondingly atmospheric pressure. Altitude and vertical speed, or at least estimates for them, can be calculated with the aid of atmospheric pressure, if the atmospheric pressure at sea-level or some other reference level is known.

In all of the aforementioned applications, one sensor is preferably an acceleration sensor and the one physical variable is acceleration. Acceleration measurement shows the device's state of motion and on the basis of this it is then possible to calculate an estimate of its speed. If desired, an error estimate depicting measurement error can also be determined for acceleration measurement, and can be exploited, along with or instead of only the state of motion, for filtering temporally at the desired strength according to the invention an estimate of the target variable calculated on the basis of the first sensor.

As one possible application of the invention, it is also possible to refer to a solution, in which, with the aid of satellite positioning, a first physical variable, which is for example altitude or vertical speed, is measured. An atmospheric-pressure sensor measures a second physical variable, which is atmospheric pressure. In that case, an estimate depicting the vertical state of motion can be determined using atmospheric-pressure measurement, which can be used to control the filtering strength of the physical variable measured using GPS.

In the following, the practical implementation and advantages of the invention are described in greater detail, with reference to the accompanying drawings. This invention will become more fully understood from the following detailed description, taken in conjunction with the accompanying drawings described herein below, and wherein like reference numerals refer to like parts.

DETAILED DESCRIPTION OF EMBODIMENTS

Figure 1:
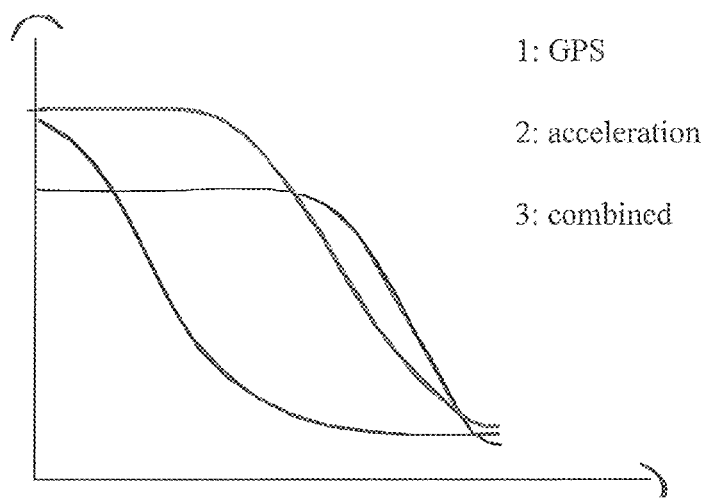
FIG. 1 is a graphical representation of a GPS speed signal (1), speed (2) estimated from an acceleration sensor on the wrist or elsewhere on the body, and the accuracy of the combined speed (3) as a function of frequency.
Figure 2:
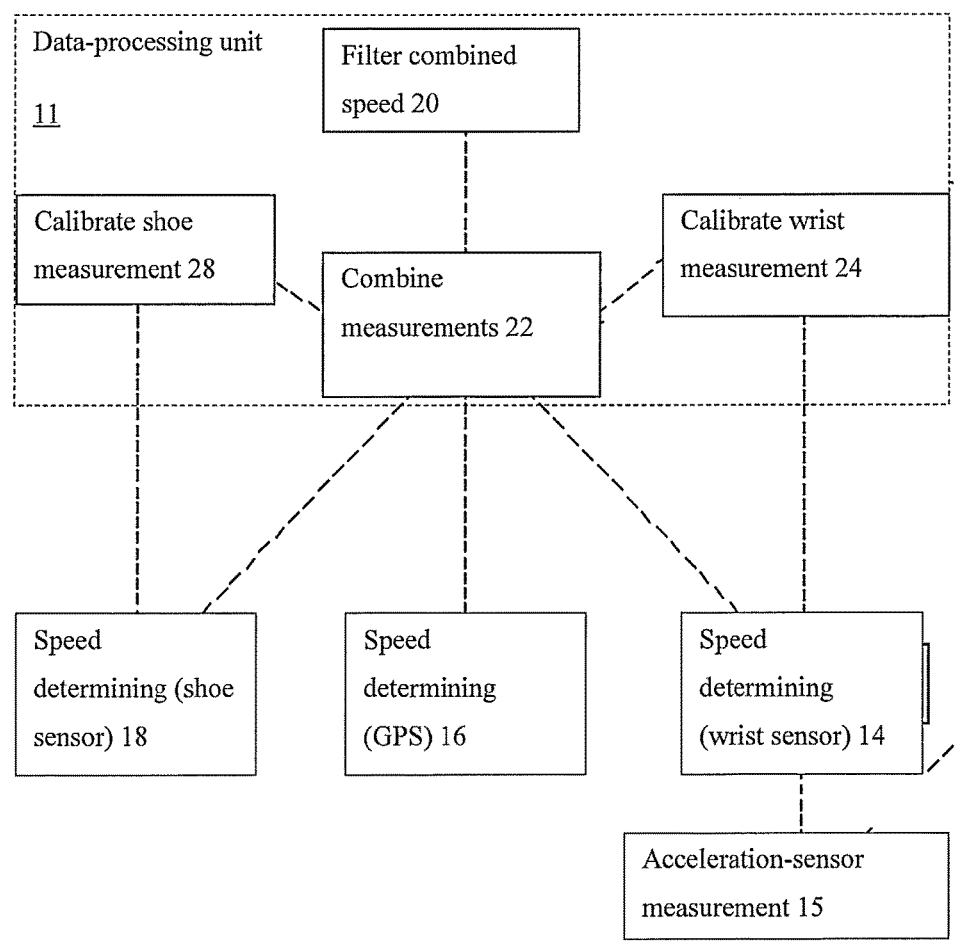
FIG. 2 is an object model of a sensor-fusion system according to one preferred embodiment of the present invention, which combines data from several speed sources, and then filters the combined speed information adaptively.

The basic principle of the invention is first examined with the aid of the object model shown in FIG. 2. Three different ways or methods of determining speed are shown by way of example, speed determining 14 (a first speed determination 14) made on a wrist using acceleration-sensor measurement 15 (e.g., a wristop computer), GPS-based speed determining 16 (a second speed determination 16), and speed determining 18 (a third speed determination 18) made using a shoe sensor (typically based on the acceleration of the foot). The velocities determined are combined centrally with the aid of data processing 22 (a processor 22) in a data processing unit 11. In the example of FIG. 2, information on the person's state of motion obtained from the acceleration measurement 15 is exploited in a filtering 20 of the combined speed.

FIG. 2 also illustrates how the system can be used for the auto-calibration of the measurements, with the aid of first and second calibration stages 24 and 28, if a measurement is, or measurements are available, the error estimate of which is less than the error estimate of the measurement to be calibrated. For example, a combined variable can be used, which does not, however, contain information on the measurement to be calibrated, and by using this combined variable the measurement model is calibrated, in order to obtain more accurate measurement values in the future. The necessary calculation is performed in the data-processing unit 11.

The combining of the velocities can be done in many ways. One way is to form for each separate speed measurement i (corresponding speed $v_i$) a relative number ($R_i$), which depicts how much error there is in the measurement of the speed. The greater the number, the greater the error estimate of the measurement, and the smaller the number, the smaller the error estimate of the measurement. The number for GPS can be formed, for example, with the aid of the GPS's HDOP number (horizontal dilution of precision) and the number of satellites seen. In acceleration and shoe determining, it is possible to use a relative or absolute pre-determined error estimate, or an error estimate determined dynamically during the performance.

The combined speed $v_{combined}$ is then obtained using the equation $$v_{combined} = \Sigma\left(v_i \frac{\Sigma R_i - R_i}{R_i}\right).$$

The combined measurement error estimate $R_{combined}$ of the speed is obtained from the equation $$R_{combined} = \frac{(\Sigma R_i - R_{smallest})R_{smallest}}{\Sigma R_i},$$

in which $R_{smallest}$ is the smallest of the error estimates $R_i$.

The filtering of the combined speed can be done, for example, with the aid of a Kalman filter (*Introduction to Random Signals And Applied Kalman Filtering*, 3$^{rd}$ edition, R. Grover and P Hwang, John Wiley & Sons, 1997). In a Kalman filter, a linear model of the system to be modelled is built, which takes into account the measurement error and the error of the system model. In the case of the example, the Kalman filter consists of only one state, which is the filtered speed $v_{filtered}$ that is desired as the end result. Because the Kalman filter filters the combined speed, the measurement error is obtained from the aforementioned equation, by means of which the measurement-error estimates of the various velocities are combined to form a single number $R_{combined}$.

The system-model error $W_{system}$ can be obtained by combining the system-error estimates calculated from the various measurements. For example, using the following equation $$W_{system} = f_{wristAcceleration}(v_{wristAcceleration}) + f_{gps}(v_{gps}) + f_{footpod}(v_{footpod})$$

in which the functions f depict the system-error estimates of each measurement. The calculation of the system-error estimate of a measurement depends on the filtering model used. In the case of the example, the Kalman filter consists of only a single state, which is speed. The system-error estimate should then be depicted as changes detected in speed.

After this, the equations of the Kalman filter are used to create an adaptive filter, which reduces the filtering when the measurements are accurate and, in turn, increases the filtering when the error of a measurement increases. Modelling of the error of the system model permits the filtering to be reduced if rapid changes are detected in the system. If, on the other hand, the frequency band is narrow, i.e. changes do not take place in the speed, filtering can be increased.

Figure 3:
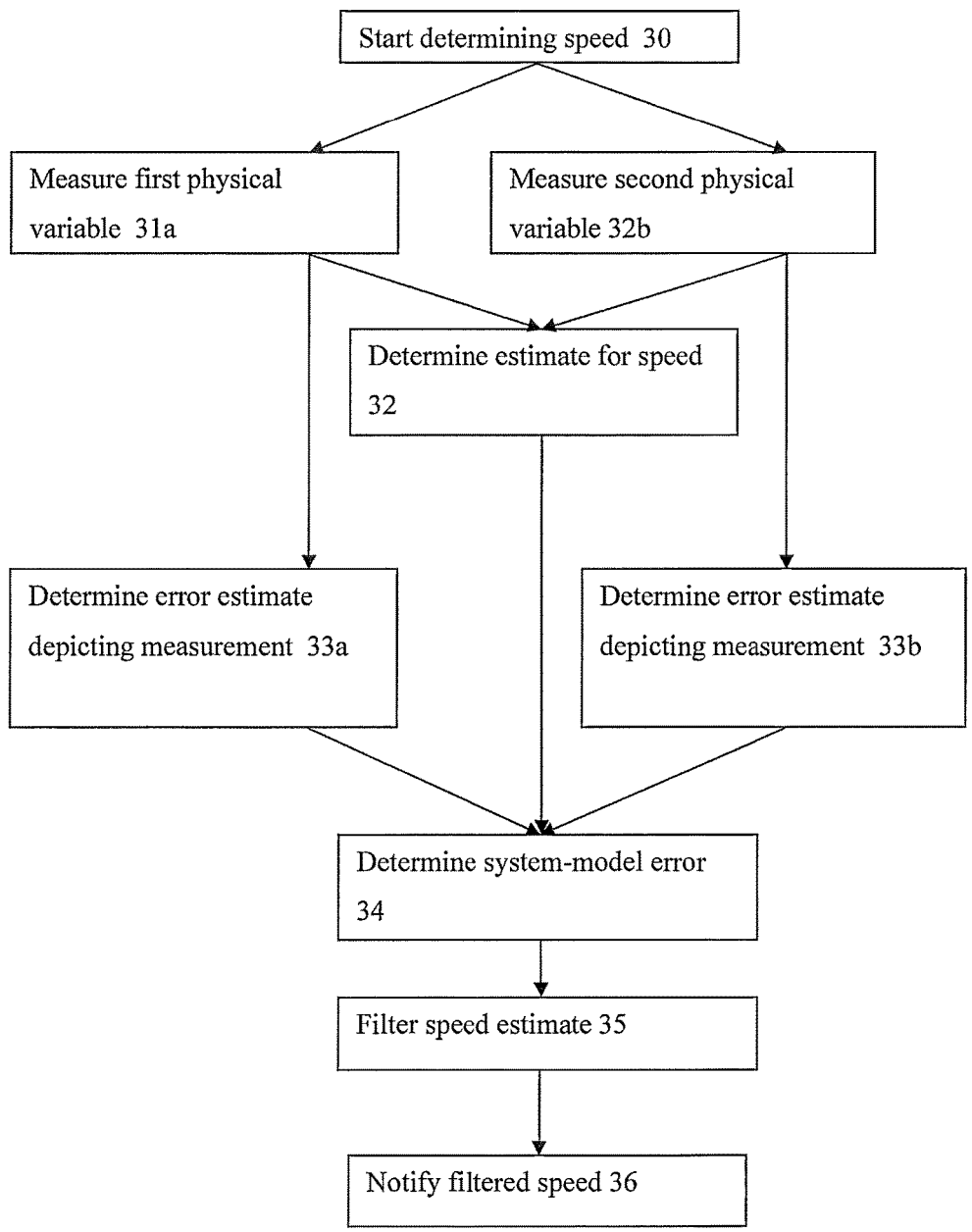
FIG. 3 is a flow diagram of a method according to a preferred embodiment of the present invention.

FIG. 3 shows a flow diagram of the method according to the invention, according to one preferred embodiment. The determining of the speed starts in stage 30. After this, the measurement of the first and second physical variables starts in stages 31a and 31b. Once sufficient data has been collected, the combined speed is calculated in stage 32, for example using the equation shown above. The system-model error is calculated in stage 34. After this, the combined speed is filtered in stage 35, in order to obtain a speed estimate with less noise. In this, the error estimate of the first measurement, determined in stage 33a, is exploited, along with either the second measurement or the error estimate determined for it in stage 33b. Once the filtered speed has been calculated, the result is typically stored in the device's memory and/or notified to the user in stage 36.

Figure 4:
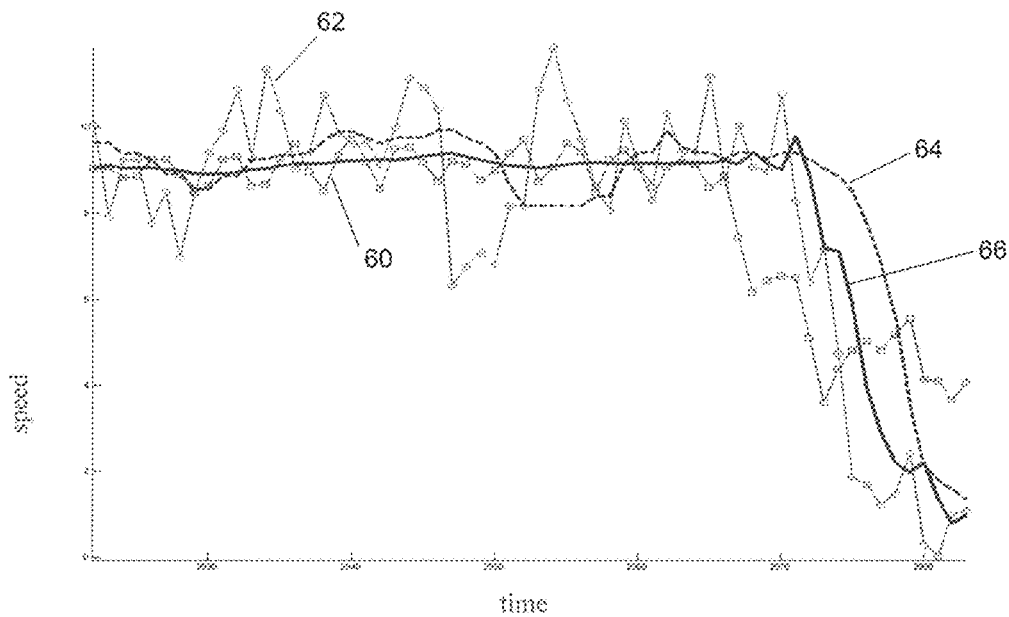
FIG. 4 is a representative graph of speed measurement data including a first set of speed data calculated from an acceleration sensor on a user's wrist, a second set of speed data obtained from GPS measurement, a corrected representation of speed using a traditional filter, and an improved representation of speed calculated using the method according to the present invention.

FIG. 4 shows a first set of speed data 60 (the speed values shown as squares) calculated from the wrist using an acceleration sensor and a second set of speed data 62 (the speed values shown as circles) obtained from GPS measurement. Both measurements are in the correct order of magnitude, but contain relatively much noise.

A third representation of speed 64 represents the speed data combined and filled in a traditional manner (median filtering) which contains considerably less noise than either the first set of speed data 60 or the second set of speed data 62, but still contains relatively sharp variations. Particular attention should be paid to the slowness of the change in the third representation of speed 64 as it estimates speed changes. The third representation of speed 64 estimates speed that is too high at some points due to the use of a filtering function that does not adapt to the situation, which always filters data over a constant time.

A fourth representation of speed 66 shows the speed that combined and filtered according to the present invention (the solid thick line). The accuracy of the fourth representation of speed 66 is noticeably even at the start of the movement and reacts rapidly to a genuine change in the speed. This is due to the fact that the filter takes into consideration a steep change in speed from the GPS and/or acceleration data, and the filtering is diminished. Thus, despite the fact that noise is filtered effectively, the speed calculated in the manner of the invention 66 reacts to genuine change in speed more rapidly than the median filtered speed.

A gps speed signal contains noise. When gps speed is averaged over a long period of time, the precision of speed measurement increases, and the frequency response bandwidth naturally decreases. Accordingly, if one desires to increase the frequency response bandwidth, then the precision of speed measurement will decrease. When the averaging is taken over a longer time and displayed data is updated at a low rate, the error is reduced and the GPS based speed accuracy is improved. The method does not provide a high level of accuracy when the speed changes rapidly. If one increases the averaging time span and speed updating rate in order to show in real time quick speed changes, the result is not desirable for battery conservation.

The principle described above can be applied not only to the measurement of speed, but also to altitude measurement. In that case, with the aid of acceleration measurement and/or pressure measurement, it will be possible to detect the person's state of motion and, with the aid of pressure measurement or GPS measurement, to adjust the temporal filtering of the estimated altitude or vertical speed, in such a way that, at points of change in motion or particularly the state of motion, the filtering will be less than when stationary, so that the system will react more rapidly to real changes in altitude.

According to preferred embodiments of the present invention, the system can enable a user to select from at least two alternatives the type of sport being performed and/or the location of the sensor, through suitable interface elements. For example, in the case of an acceleration sensor, both the type of sport (e.g., running/walking) and the location of the acceleration sensor (e.g., sole of foot/thigh/wrist/shoulder) will affect the signal's strength, quality, and specific features. Thus, several different signal-processing algorithms can be programmed into the device, from which the most suitable for the conditions is selected according to the type of sport or the location of the sensor. In certain situations, the selection of the sport and thus also the changing of the algorithm can also take place with the aid of detection, for example by utilizing a defined step frequency.

More generally, it can be stated that the system can comprise a condition parameter, which can be given different values and which effects, in turn, which manner of calculation of the target variable will be used.

Figure 5A:
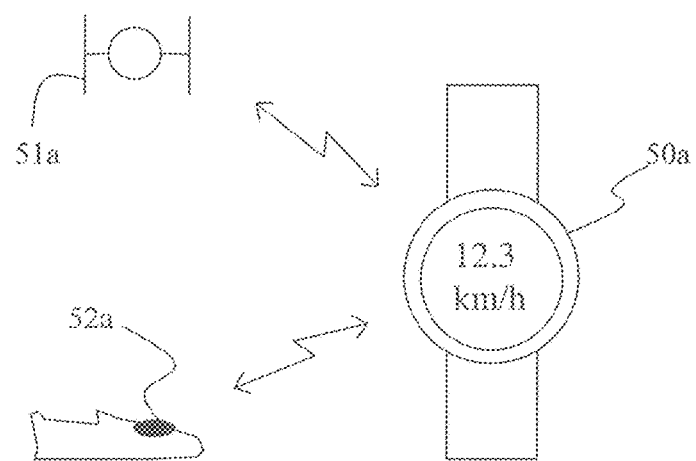
FIGS. 5a-5f show measurement-system implementations according to other preferred embodiments of the present invention.

FIG. 5a shows an example of a measuring system utilizing the method according to the invention, which comprises a wristop computer 50a, which can receive satellite-positioning information from a satellite-positioning system 51a, as well as acceleration information, for example from an acceleration sensor 52a installed in a shoe. On the basis of the measurement data, the wristop computer is arranged to calculate the filtered speed according to the invention.

Figure 5B:
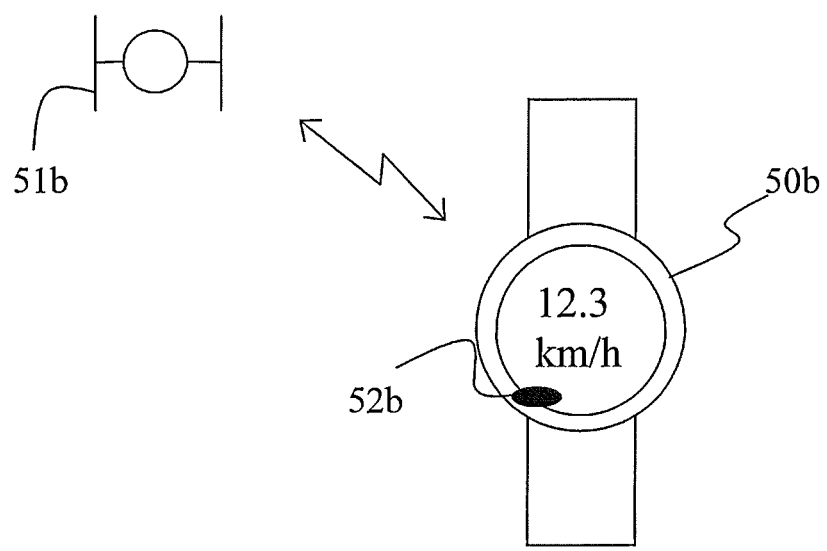

FIG. 5b shows a system corresponding to that of FIG. 5a, but in it the acceleration sensor 52b is integrated directly into a wristop computer 50b. The satellite-positioning system 41b is linked wirelessly 50b to the wristop computer. In the case of altitude or vertical-speed measurement, the sensor 52b can also be a pressure sensor.

Figure 5C:
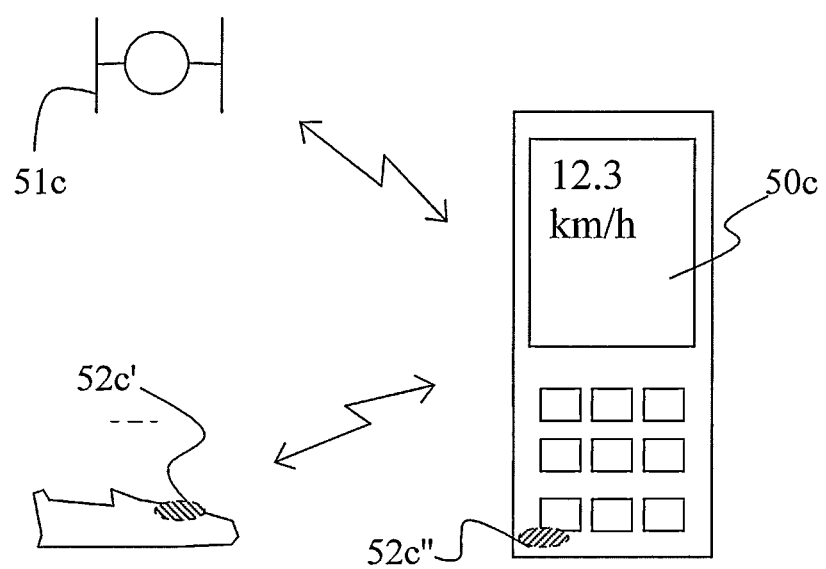

FIG. 5c shows a variation of the system of FIG. 5a, in which instead of a wristop computer a mobile telephone or tablet device 50c is used as the terminal device, which receives information from a satellite-positioning system 51c and an acceleration sensor 52c'.

Figure 5D:
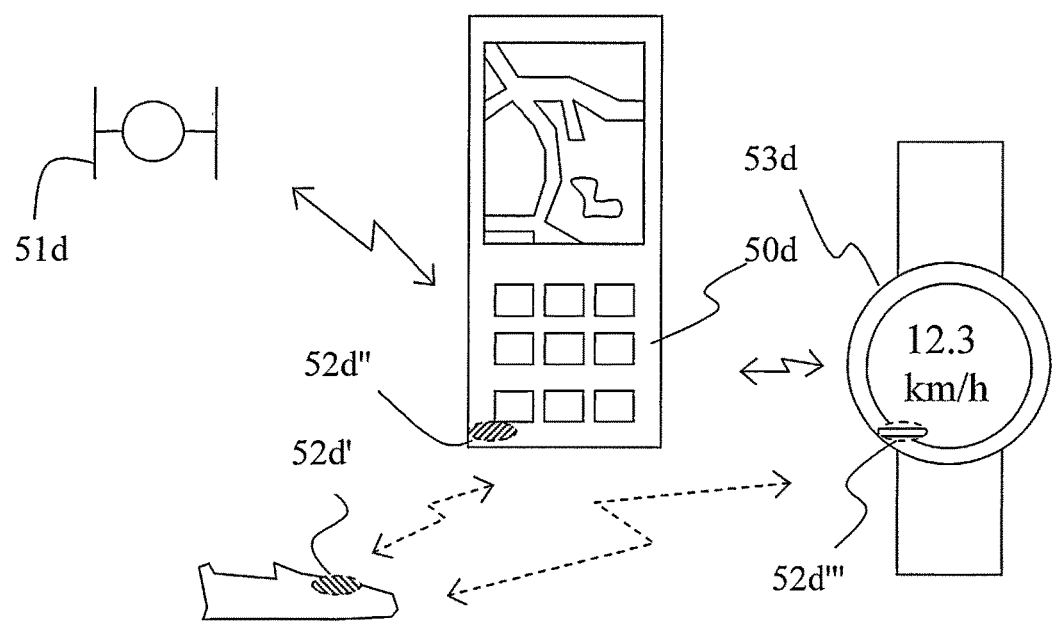

FIG. 5d shows a system, in which both a mobile telephone 50d and a wristop computer 53d are used. The mobile telephone 50d can receive and store satellite-positioning information from a system 51d and forward position or speed information to the wristop computer 53d. The acceleration sensor 52d' can be connected directly to the wristop computer 53d or the mobile telephone 40d.

Figure 5E:
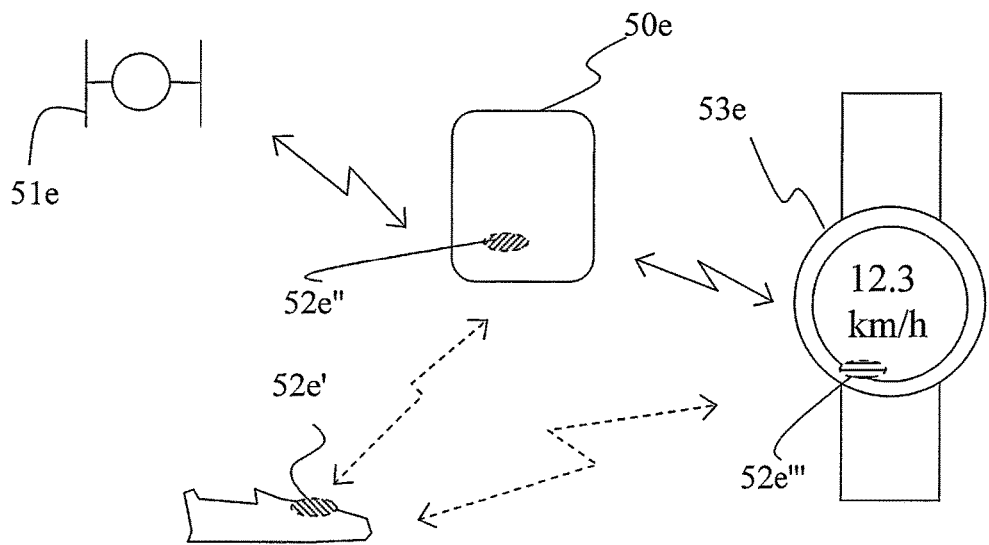

FIG. 5e shows a system, in which a wristop computer 53e and a separate GPS measuring device 50e (a 'GPD pod') are used, which communicate wirelessly with the wristop computer 53e. The GPS measuring device 50e can thus forward position or speed information to the wristop computer 53e. A separate acceleration sensor 52e' can be linked directly to the wristop computer 53e or the GPS measuring device 50e.

FIGS. 5c-5e also show variations, in which the acceleration sensor 52c'', 52d'', 52d''', 52e'', or 52e''' is located not in a shoe, but in a mobile telephone, a GPS measuring device, or a wristop device.

Figure 5F:
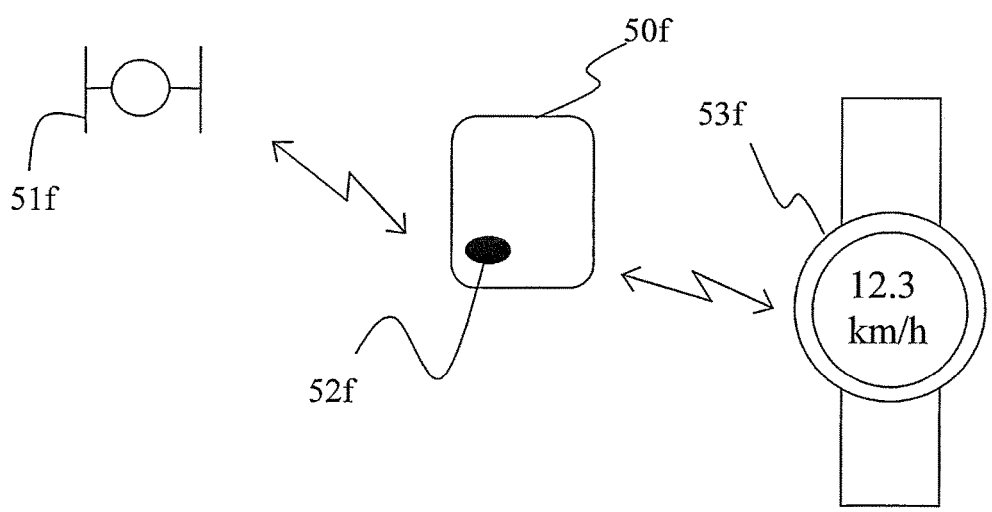

FIG. 5f further shows a particularly interesting application in the form of a system corresponding to that of FIG. 5e, which uses a wristop computer 53f and a separate satellite-positioning module, such as a GPS measurement device 50*f* (a 'GPS pod'), which communicates wirelessly with the wristop computer 53*f* and also contains an acceleration sensor 52*f*. Thus, a separate acceleration-sensor device is not required; instead acceleration information too can be transmitted wirelessly from the GPS measurement device 50*f* to the wristop computer 53*f*. In addition to, or instead of the acceleration sensor, there can be a pressure sensor in the GPS measurement device, so that it will also be suitable for altitude measurement according to the method.

Some of the embodiments of FIGS. 5*c*-5*f* have the advantage that GPS measurement takes place with the aid of its own power supply, and the operating time of the wristop device or mobile telephone thus increases. In these cases, the wristop device can also be designed to be dry-cell-battery operated instead of rechargeable-battery operated.

Especially advantageous is an embodiment, in which at least one of the measurement, preferably both measurements, and the calculation of the target variable are performed outside the wristop device or mobile telephone. Such a situation is, for example, in the system according to FIG. 5*f*, in which the GPS measurement device 50*f* also contains the means for performing the necessary calculation. The wristop device or mobile telephone then acts essentially as only a display, so that its power consumption is very small compared to a situation in which one or all of these operations would be performed in it. This is important, if it is remembered that exercise can last for a long time and a wristop device or mobile telephone will typically have other power-consuming applications too while a sport is performed (for example, heart-rate measurement or music functionalities), and operations relating to the measurement of speed and position typically consume a relatively great deal of power.

Instead of a satellite-positioning system, it is also possible to use a terrestrial wireless positioning system, for example a base-station-based positioning system.

If the satellite-positioning sensor and/or the acceleration sensor is located in a different device unit to the actual terminal device, for example according to any of the solutions described above, the error estimate depicting the accuracy of the positioning and/or the acceleration measurement, typically a so-called quality factor or factors, can be transmitted wirelessly from the sensor unit to the terminal device. In the terminal device, such a quality factor or some variable derived from it can be used directly as an error estimate.

Depending on the variable being measured, the quality factor can depend on, for example, the type of sensor, the measurement location, and/or the values of the sensor.

Particularly in the case of satellite-positioning, the quality factor depends greatly on the values of the data provided by the satellite-positioning sensor. In the case of the GPS standard, if the GPS gives only ordinary NMEA (National Marine Electronics Association) information, the quality factor can be calculated from the following values contained in an NMEA message:

number of satellites in solution, and
horizontal dilution of precision, HDOP

If available, it is also possible to utilize the value according to the SIRF IV standard:

estimated horizontal position error, EHPE, on the basis of which a better quality factor will be obtained.

Thus, in order to calculate the quality factor, either these numbers separately, or alternatively the quality factor, calculated on their basis should be transmitted to the terminal device.

In the case of a shoe acceleration sensor, a cycling acceleration sensor, or a wrist acceleration sensor, typically only the type of sensor is of significance, so that on the other hand it will be sufficient to transmit only information on the type of sensor as the applied value, instead of a quality factor. The values required to calculate the quality factor, or the quality factor itself can be transmitted according to a suitable radio protocol, such as the ANT or Bluetooth protocols.

Generalizing, it can be stated that the method according to the invention can also be performed entirely or partly in a portable device with a display, which is arranged to display the calculated value of the target variable to the user. The portable device can be a wristop computer, a smart phone, a tablet computing device, a laptop, a portable satellite-positioning device, an outdoor-recreation computer, a yachting computer, and other portable electronic computing devices.

Combinations of the solutions described above and variations other than those described in detail are also possible. While the preferred embodiments of the invention have been illustrated and described, it will be appreciated that various changes can be made therein without departing from the spirit and scope of the invention. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. A method for improving the accuracy of a measured physical performance target variable of a user in performing a sporting activity, the method comprising:
    measuring a first physical performance variable of the user with the aid of a first sensor positioned within one of a wristop computer, a shoe mounted sensor and a body mounted sensor;
    measuring a second physical performance variable of the user with the aid of a second sensor;
    calculating a value of the physical performance target variable with the aid of the measurements of the first and second physical performance variables;
    determining an estimate for the physical performance target variable with the aid of the measurement of at least the first physical performance variable;
    determining at least a first error estimate, which depicts the error in the measurement of the first physical performance variable;
    adapting a filter to a filtering strength that corresponds to the magnitude of said at least first error estimate;
    filtering the estimate of the physical performance target variable using both the first error estimate and the measurement result of the second physical performance variable; and
    displaying a value with an improved accuracy of the physical performance target variable to the user, wherein the target variable is speed or altitude.

2. The method of claim 1, wherein the estimate for the target variable is calculated with the aid of the measurement of the first and second physical variable.

3. The method of claim 1, further including:
determining a second error estimate depicting the error of the measurement of the second physical variable; and filtering the estimate of said physical performance target variable using both the first and the second error estimates.

4. The method of claim 1, wherein the strength of the filtering of said physical performance target value is increased when the error estimate of the first and/or second physical variable increases.

5. The method of claim 1, further including: detecting the rate of change of the target variable; and altering the strength of the filtering in the calculation of the target variable depending on the rate of change of the first and/or second variable.

6. The method of claim 1, wherein the estimate of the target variable is filtered during a filtering period which length is arranged to adapt to measured changes of the first and/or second physical variable.

7. The method of claim 1, wherein the first sensor is a satellite-positioning sensor, and wherein the first physical performance variable is the user's speed during the performance of the sporting activity, or absolute or relative location.

8. The method of claim 1, wherein the first sensor is an atmospheric-pressure sensor, and wherein the first physical performance variable is atmospheric pressure occurring during the performance of the sporting activity.

9. The method of claim 1, wherein the first sensor is a satellite-positioning sensor, and wherein the first physical performance variable is altitude during the performance of the sporting activity.

10. The method of claim 1, wherein the second sensor is an acceleration sensor, and wherein the second physical performance variable is user's acceleration during the performance of the sporting activity.

11. The method of claim 1, wherein the second sensor is a pressure sensor, and wherein the second physical performance variable is atmospheric pressure during the performance of the sporting activity.

12. The method of claim 1, wherein the method is performed entirely or partly in a mobile telephone.

13. The method of claim 1, wherein the method is performed entirely or partly in a satellite-positioning module or other device without a display.

14. The method of claim 1, wherein the method is performed entirely or partly in a portable satellite-positioning device, an outdoor-recreation computer, a yachting computer, or other device with a display.

15. The method of claim 1, wherein the estimate of the target variable is filtered with the aid of a Kalman filter.

16. The method of claim 1, wherein the first and the second sensors are based on different measurement techniques that have different error profiles as a function of the measurement frequency.

17. The method of claim 1, wherein the filtering of the target variable is implemented by determining an error estimate for a computation model that depicts how well the computation model used corresponds to the real situation, with the measurement of at least the measurement of the second physical variable, and filtering the estimate of the target variable at a strength that depends on both the error estimate of the measurement and the error estimate of the said computation model.

18. The method of claim 1, wherein at least two of the following are located in separate device units, which are arranged to communicate wirelessly with each other:

a first sensor,
a second sensor,
a mechanism for calculating the value of the target variable, and
a device unit, which contains at least one of the said sensors and is arranged to transmit an error estimate of the measure made with the aid of the sensor in question wirelessly to the device unit that comprises the mechanism for calculation the value of the target variable.

19. The method of claim 1, wherein a selection of at least two alternative types of sporting activities can result in different values which in turn affects the manner of calculation used for the physical performance target variable.

20. A system for improving the accuracy of a measured user's physical performance target variable, the system comprising:
a wristop computer including at least first and second sensors for measuring a first and second physical performance variables, respectively;
a first mechanism configured to:
calculate a value of said physical performance target variable by measurements of said first and second physical performance variables,
determine an estimate for the physical performance target variable with the aid of the measurement of at least the first physical performance variable,
to determine at least a first error estimate, and
adapting a filter to have a filtering strength that corresponds to the magnitude of said at least first error estimate and the measurement result of the second physical performance variable,
a second mechanism configured to filter the estimate of the physical performance target variable using both the first error estimate and the measurement of the second physical performance variable, and
a display for displaying a value with an improved accuracy of the physical performance target variable to the user,
wherein the target variable is speed or altitude.

21. The system of claim 20, wherein at least two of the first sensor, the second sensor, and the first mechanism are located in first and second separate device units.

22. The system of claim 21, wherein the first second device unit is a wristop device, and wherein the second first device unit is a portable device with a display.

23. The system of claim 21, wherein the device unit that contains at least one of the said sensors is arranged to transmit wirelessly an error estimate of the measurement made with the aid of the sensor in question.

24. The system of claim 20, wherein at least one of the first and second sensors are located in a device unit without a display.

25. The method of claim 1, wherein a selection of one of at least two alternative types of sporting activities results in the selection of one of at least two available sport activity tracking algorithms.

26. The system of claim 20, wherein at least one of the first and second physical performance variables is altitude, and wherein the physical performance target variable is vertical speed.

27. The system of claim 26, wherein the wristop computer determines the user's rate of climb and/or rate of descent.

28. The system of claim 26, wherein the other of the first and second physical performance variable is user's horizontal speed.

29. The system of claim 20, wherein the first and second physical performance variables are selected from the group consisting of user's horizontal speed, user's horizontal acceleration, user's altitude, user's vertical speed, and combinations thereof.

\* \* \* \* \*